US012199392B2

(12) United States Patent
Raab et al.

(10) Patent No.: US 12,199,392 B2
(45) Date of Patent: Jan. 14, 2025

(54) COMPONENT PACK OF TECHNICAL COMPONENTS, AND TECHNICAL COMPONENT

(71) Applicant: TE Connectivity Germany GmbH, Bensheim (DE)

(72) Inventors: Stefan Raab, Woert (DE); Harald Kraenzlein, Woert (DE); Martin Bleicher, Woert (DE); Jochen Fertig, Woert (DE); Gerhard Goegelein, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 790 days.

(21) Appl. No.: 16/950,319

(22) Filed: Nov. 17, 2020

(65) Prior Publication Data

US 2021/0151904 A1 May 20, 2021

(30) Foreign Application Priority Data

Nov. 19, 2019 (DE) ......................... 102019131150.0

(51) Int. Cl.

*H05K 13/00* (2006.01)
*H01R 4/18* (2006.01)
*H01R 43/048* (2006.01)

(52) U.S. Cl.

CPC ......... *H01R 4/188* (2013.01); *H01R 43/0482* (2013.01)

(58) Field of Classification Search

None
See application file for complete search history.

(56) References Cited

U.S. PATENT DOCUMENTS 3,361,251 A 1/1968 Olsson
3,650,706 A 3/1972 Parsons
4,697,340 A * 10/1987 Finney .................. H01R 43/18 206/820
4,871,062 A 10/1989 Gordon, Jr.
5,133,847 A 7/1992 Boyd
5,564,571 A 10/1996 Zanotti
5,982,636 A * 11/1999 Stahl ...................... H05K 3/326 361/810
8,388,382 B2 3/2013 Ikeda et al.
2009/0249609 A1 10/2009 Heacox et al.
(Continued)

FOREIGN PATENT DOCUMENTS

DE 2549200 A1 5/1977
DE 268443 A1 5/1989
(Continued)

OTHER PUBLICATIONS

Partial European Search Report, Application No. EP 20 20 8338, dated Jul. 16, 2021, 19 pages.
(Continued)

*Primary Examiner* — Alexander S Thomas
(74) *Attorney, Agent, or Firm* — Barley Snyder

(57) ABSTRACT

A component pack including a carrier strip extending in a longitudinal direction and a plurality of technical components formed initially separately from the carrier strip and each fastened on the carrier strip. The technical components project from the carrier strip laterally in a transverse direction of the carrier strip.

8 Claims, 5 Drawing Sheets

(56) References Cited

U.S. PATENT DOCUMENTS

| | | | |
|---|---|---|---|
| 2012/0015550 | A1 | 1/2012 | Ikeda et al. |
| 2013/0199036 | A1 | 8/2013 | Lee |

FOREIGN PATENT DOCUMENTS

| | | | |
|---|---|---|---|
| DE | 4428761 | A1 | 2/1996 |
| FR | 2856199 | A1 | 12/2004 |
| JP | S60-63884 | A | 4/1985 |
| JP | H5-121143 | A | 5/1993 |
| JP | 2008-19002 | A | 1/2008 |
| WO | 2011021614 | A1 | 2/2011 |

OTHER PUBLICATIONS

Abstract of FR 2856199, dated Dec. 17, 2004, 1 page.
German Office Action, dated May 9, 2020, 6 pages.
English translation of JP 2008019002, dated Jan. 31, 2008, 30 pages.
Abstract of DE 4428761, dated Feb. 15, 1996, 1 page.
Abstract of DE 2549200, dated May 12, 1977, 1 page.
Examination Report dated Dec. 13, 2023, corresponding to Application No. 20 208 338.2-1201, 10 pages.
Japanese Office Action dated Jul. 23, 2024 with English translation, corresponding to Application No. 2020-190189, 17 pages.

* cited by examiner

COMPONENT PACK OF TECHNICAL COMPONENTS, AND TECHNICAL COMPONENT

CROSS-REFERENCE TO RELATED APPLICATION

This application claims the benefit of the filing date under 35 U.S.C. § 119(a)-(d) of German Patent Application No. 102019131150.0, filed on Nov. 19, 2019.

FIELD OF THE INVENTION

The present invention related to a component pack and, more particularly, to a component pack including a plurality of technical components.

BACKGROUND

A consequence of, for example, the increasing hybridization and electrification of vehicle drive trains and the increasing electrification of auxiliary units and equipment of vehicles is, inter alia, electrical contact devices (such a contact device is also referred to below as a technical component), such as for example PCON contact devices, becoming larger. Because there will be a sharp increase in demand for these contact devices in the coming years, this entails not inconsiderable packaging problems. FIG. 1 shows, for example, a packaging carrier 2 according to the prior art which is to be handled manually for thirty PCON 21 contact devices. If, for example, a high seven-digit number of such PCON 21 contact devices are packaged and transported in a year, this causes not insignificant logistical problems and costs.

Owing to the increasing hybridization and electrification of vehicles, other problems occur in other sectors. Thus, for example, the handling of punched cell connector plates (such a cell connector plate is also referred to below as a technical component) after they have been punched is a problem. The cell connector plates are separate and must first be painstakingly aligned and bundled up. Moreover, handling such a bundle when it is further processed can only be done at an additional cost. There is a need to provide an improved manner and/or form of handling and/or packing for the abovementioned and other technical components.

SUMMARY

A component pack including a carrier strip extending in a longitudinal direction and a plurality of technical components formed initially separately from the carrier strip and each fastened on the carrier strip. The technical components project from the carrier strip laterally in a transverse direction of the carrier strip.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
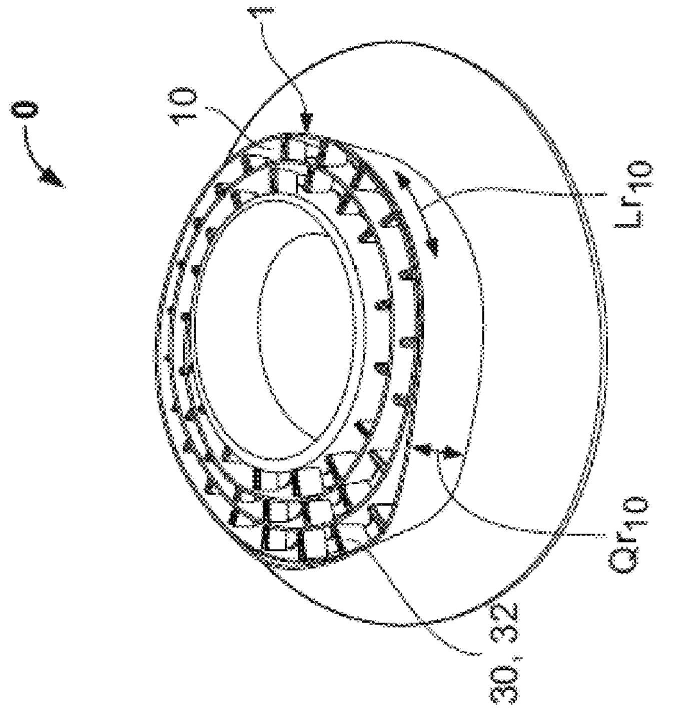
FIG. 2 is a perspective view of a component pack according to an embodiment rolled up spirally to form a bundle.
Figure 1:
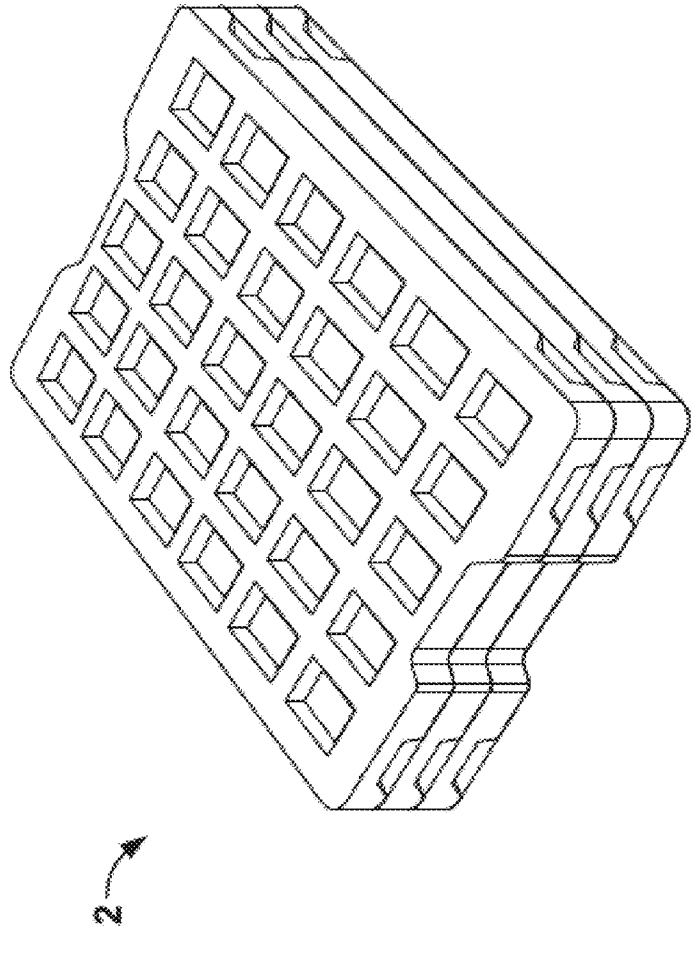
Fig. 1 PRIOR ART
FIG. 1 is a perspective view of a packaging carrier according to the prior art.

The invention is explained in detail below with the aid of exemplary embodiments and with reference to the attached schematic and not-to-scale drawings. Sections, elements, parts, units, components and/or diagrams which have an identical, univocal or similar form and/or function are identified by the same reference numerals. A possible alternative embodiment which is not explained and is non-exhaustive, a static and/or kinematic reversal, a combination, etc of the exemplary embodiments of the invention or of a component, a diagram, a unit, a part, an element or a section thereof can moreover be derived.

In the invention, a feature (section, element, part, unit, component, function, size, etc) can be configured to be positive, i.e. present, or negative, i.e. absent. In this specification, a negative feature is not explained explicitly as a feature unless importance is attached according to the invention to the fact that it is absent. In other words, the invention which is actually made and is not constructed by the prior art consists in omitting this feature.

A feature of this specification can be applied not only in a stated fashion and/or manner but also in a different fashion and/or manner (in isolation, combined, replaced, added to, considered separately, omitted, etc). It is in particular possible to replace, add or omit a feature in the patent claims and/or the description with the aid of a reference numeral and a feature associated therewith or vice versa in the description, the patent claims and/or the drawings. A feature can consequently furthermore be described and/or specified in detail in a patent claim.

The features of the description can also be interpreted as optional features (given the (initially largely unknown) prior art), i.e. each feature can be understood as an optional, arbitrary or exemplary feature, i.e. a non-compulsory one. It is thus possible for a feature, and possibly including its peripheral definition, to be separated from an exemplary embodiment, wherein this feature can then be transposed to a generalized inventive concept. The lack of a feature (negative feature) in an exemplary embodiment indicates that the feature is optional with reference to the invention. Moreover, a technical term for a feature can also be read as a generic term for the feature (and possibly a further hierarchical subdivision by subgenera), as a result of which the feature can be generalized, for example taking equivalent effect and/or equivalent value into account.

The invention is explained below in detail with the aid of exemplary embodiments of two alternatives (an electrical contact part or terminal 30, 32 (FIGS. 2 to 6) and a blank 30, 34 (FIG. 7)) of a spirally rolled-up bundle 0 according to the invention or of a component pack 1 according to the invention of technical components 30. The technical components 30 can, for example, be assemblies 30, prefabricated parts 30, blanks 30, etc, in particular for the automotive sector. Only those physical portions of a subject of the invention are shown which are required for an understanding of the invention. In an embodiment, the component pack 1 is for the purpose of, for example, further processing, manufacturing, packaging, transport, additional further processing and/or a component-determined final use of a plurality of technical components 30.

Although the invention is described and illustrated in more detail using exemplary embodiments, the invention is not limited by the exemplary embodiments disclosed. Other variations can be derived therefrom without going beyond the protective scope of the invention. This invention can thus also be applied generally to corresponding mechanical, electrical, magnetic and/or optical technical components 30 and/or in a sector other than the automotive one, such as, for example, the consumer electronics sector, the power electronics sector, the electrical engineering sector, etc, and very generally in technology. The technical component 30 can take the form of, for example, an electrical connector, an electrical contact part or an electrical contact device. The technical component 30 can moreover take the form of, for example, an electrical high-voltage plug connector, an electrical PCON contact device or, for example, also an electrical MCON contact device.

A technical component 30 is here a component which contributes to the functioning of a technical entire entity and does not itself fulfil any overall function; it is therefore not an entire entity. Technical components 30 should be understood to be, for example, assemblies as groups of components or parts, in particular individual parts such as, for example, electrical connectors, multi-part electrical contact devices, etc; identical parts; differing parts; similar parts; prefabricated parts; individual parts such as, for example, single-part electrical contact apparatuses, cell connector plates, etc; blanks; individual part blanks such as, for example, cell connector plate blanks, etc.

An assembly can, for example, take the form of a multi-part or two-part technical component 30. Moreover, such an assembly can itself comprise more than one assembly. An individual part can understood to be, for example, an object which is integral or made from a single piece of material and cannot be taken apart without destroying it. A prefabricated part is, for example, essentially suited to direct use. A blank is understood to be a workpiece which has already passed through a manufacturing step in a manufacturing chain which may be located elsewhere and is provided for a further manufacturing step.

Figure 3:
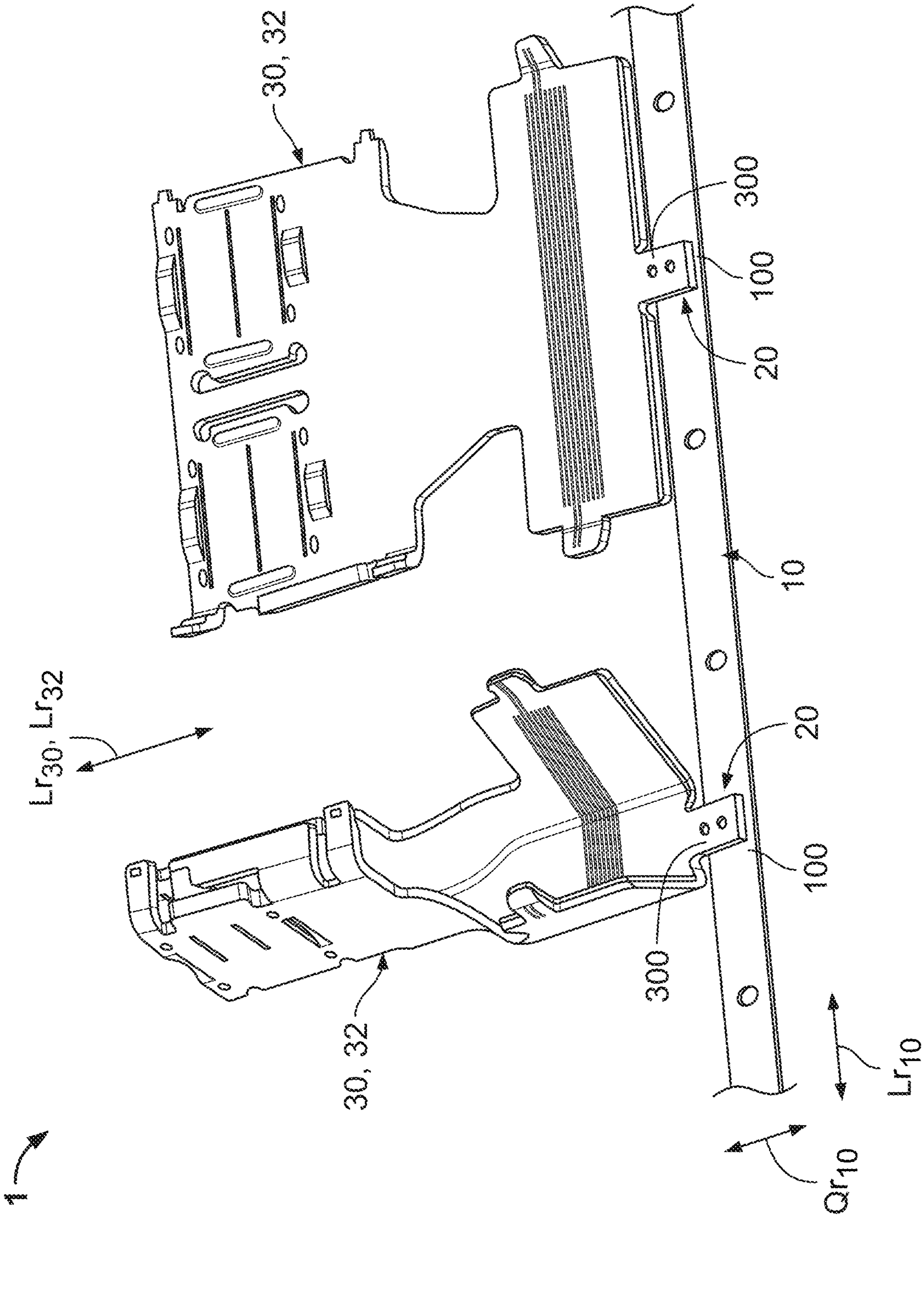
FIG. 3 is a perspective view of a component pack according to an embodiment with a single carrier strip.
Figure 4:
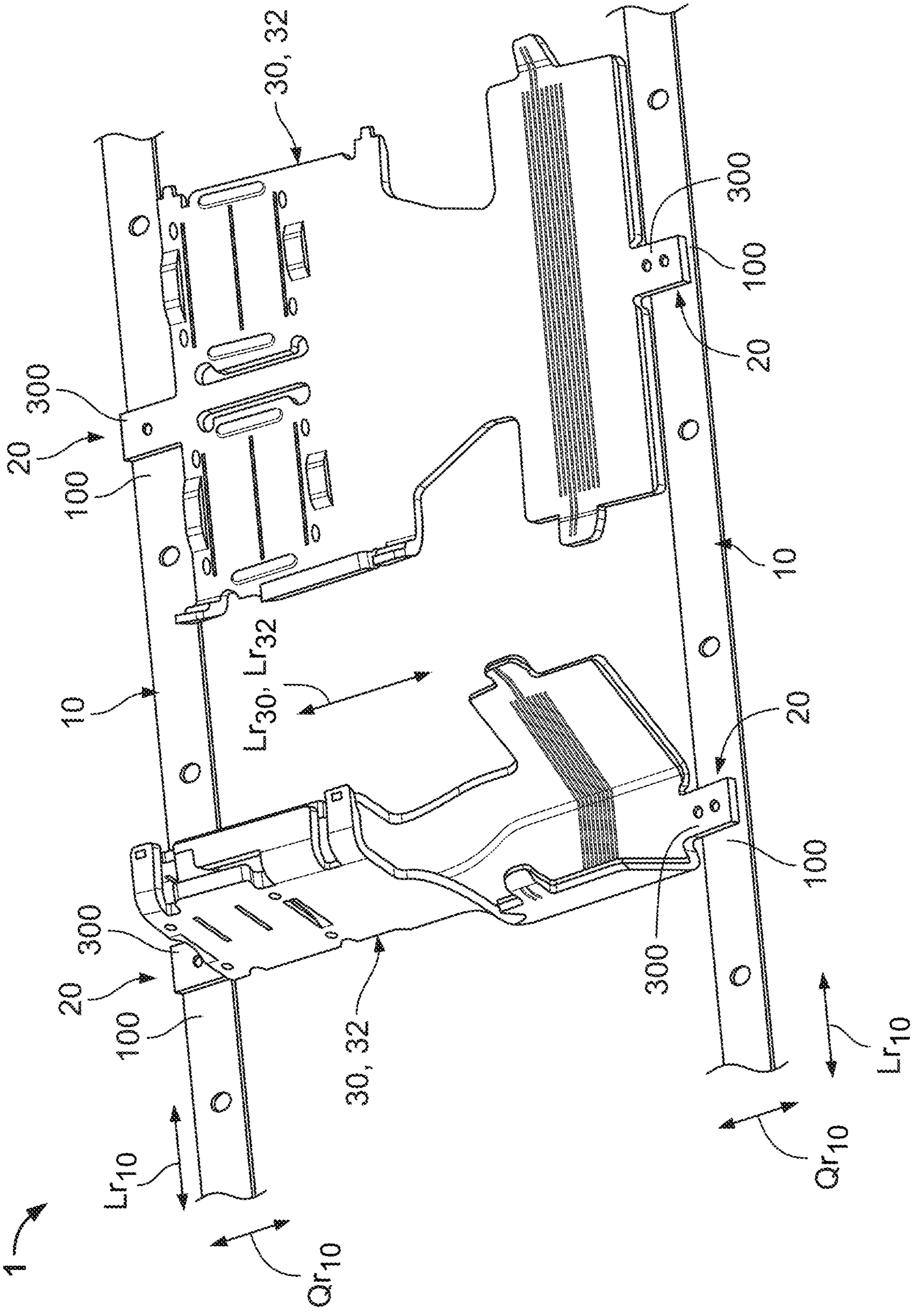
FIG. 4 is a perspective view of a component pack according to an embodiment with a pair of carrier strips.

The first alternative embodiment of the invention is explained below with the aid of electrical contact devices 30, 32; 30, 32, shown by way of example, as electrical terminals 30, 32; 30, 32. A contact device 30, 32' which can be seen on the right in each case in FIGS. 3 and 4 hereby takes the form of a contact device 30, 32' which has been obtained after a punching procedure and has not yet been bent together. This formation is also referred to below as a contact device 30, 32. Two embodiments of portions of component packs 1 are shown in FIGS. 3 and 4 in a single component pack 1. In other words, these figures are to be interpreted such that only either the contact devices 30, 32 to be seen on the left in the relevant figure or those to be seen on the right are configured in large numbers on/in a single component pack 1.

It is moreover possible to refer to such "contact devices 30, 32" also as blanks 30, 32 and optionally to process them according to the second alternative embodiment of the invention. The following embodiments for the contact devices 30, 32; 30, 32 can of course also be transposed to other terminals 30 (see below) or other technical components 30 such as, for example, electrical connectors (see below), etc.

In the electrical sector (electronics, electrical engineering, electrical equipment, electrical power engineering, etc), a large number of electrical connection apparatuses or connection devices, female connectors, male connectors and/or hybrid connectors, etc (referred to below as (electrical) connectors) are known which are used to transmit electrical currents, voltages, signals and/or data at a broad spectrum of currents, voltages, frequencies and/or data rates. In a low-, medium- or high-voltage context, and in particular in the automotive sector, such connectors need to ensure the transmission of electricity, signals and/or data continuously, repeatedly and/or quickly after a relatively long period of inactivity in an environment which is subject to mechanical stresses, is warm and possibly hot, is unclean, is damp and/or is chemically aggressive.

Moreover, an electrical connecting device, for example having or comprising an actual contact apparatus (contact part, terminal; usually formed from a single piece of material or integrally, for example a contact element, etc, almost exclusively in the form of a mass-produced small part) or a contact device (contact part, terminal; usually formed from multiple parts, two parts, as a single piece, from a single piece of material, for example a single- or multi-part (crimping) contact device, possibly in the form of a mass-produced large part), must be securely accommodated in said connector.

According to the first alternative embodiment of the invention, as shown in FIGS. 2 to 6, a plurality (see FIG. 2) of initially separately formed contact devices 30, 32 are fastened (fastening 20) to at least one carrier strip 10 which extends in its longitudinal direction Lr10. The contact devices 30, 32 here protrude from the carrier strip 10 in a transverse direction Qr10 of the carrier strip 10. In the present case, the transverse direction Qr10 is essentially parallel to the longitudinal directions Lr30, Lr32 of the contact devices 30, 32. Other positions, i.e. a slanting arrangement, may be used here. When a contact device 30, 32 is being mechanically rigidly connected to the carrier strip 10, immediately after this or later, the resulting component pack 1 can be further rolled up spirally to form a bundle 0.

The carrier strip 10 can be formed from a metal, a plastic, a composite material, for example a fiber composite material, a textile or cardboard. This means, by implication, that the carrier strip 10 may not be formed from a metal, a plastic, a composite material, for example a fiber composite material, a textile or cardboard.

The technical components 30, i.e. all or essentially all of them, are each fastened on the carrier strip 10 in four, five or six translational directions and four, five or six rotational directions. This means, for example, that all of the six possible degrees of freedom—three translational and three rotational degrees of freedom—with their respective two directions can be denied for the individual technical components 30 with respect to the carrier strip 10, and vice versa. Such a component pack can comprise, for example, more than 25, 30, 50, 100, 200, 325, 500, 750, 1000, 2000, 5000, 10,000 or more technical components 30.

The fastening 20 of the contact devices 30, 32 is in principle not integral and can be effected in an interlocking, frictional and/or bonded fashion, i.e. may also be made from a single piece of material with the carrier strip 10, wherein the carrier strip 10 is produced from metal. Other options for the fastening and other materials for the carrier strip 10 can of course be used. In the present case, in the exemplary embodiments in FIGS. 3 and 4, an essentially frictional fastening 20 of the contact devices 30, 32 to/on the carrier strip 10 is effected by, in each case, at least one third separate part. Such a separate third part for the fastening 20 can, for example, take the form of a rivet, a clip, a screw, etc. Alternatively, an individual fastening 20 can be formed solely by the technical component 30 and the carrier strip 10. Mechanical devices and/or apparatuses of the carrier strip 10 and the technical components 30 can hereby be used.

The technical components 30 can be fastened on the carrier strip 10 by being welded, soldered, adhesively bonded, clinched/joined, riveted, peened over, press-fitted, crimped, clipped, snap-fitted and/or screwed, etc. This means, by implication, that the technical components 30 may not be fastened on the carrier strip 10 by being welded, soldered, adhesively bonded, clinched/joined, riveted, peened over, press-fitted, crimped, clipped, snap-fitted and/or screwed, etc.

The fastenings 20 between the technical components 30 and the carrier strip 10, in an embodiment, all take the same or identical form in the component pack 1. The fastenings 20 can here bridge a distance between the actual technical components 30 and the actual carrier strip 10. The fastenings 20 can moreover comprise predetermined breaking points for detaching the technical components 30 from the carrier strip 10, in particular by bending them to one side.

In the respective fastening 20, the technical components 30 can pass through the carrier strip 10 and/or the carrier strip 10 can pass through the technical components 30. This also means that only the carrier strip 10 can pass through the technical components 30 in the respective fastening 20, or only the technical components 30 can pass through the carrier strip 10 in the respective fastening 20.

The technical component 30 according to the invention has a front free edge in its longitudinal direction Lr30 and a rear free edge in its longitudinal direction Lr30, wherein the technical component 30 has a fastening device 300 serving exclusively for mechanical purposes on/in the front free edge and/or a fastening device 300 serving exclusively for mechanical purposes on/in the rear free edge, by which the technical component can be mounted on at least one carrier strip 10.

This means that the connector, the contact part, the contact device, the high-voltage plug connector, the PCON contact device, etc has a front free edge in its longitudinal direction with a plug-in face, and/or a rear free edge in its longitudinal direction with a free end of an electromechanical and/or different connecting section. In each case a fastening device which serves exclusively for mechanical purposes may hereby be provided or configured on/in the front free edge and/or on/in the rear free edge.

The connector, the contact part, the contact device, the high-voltage plug connector, the PCON contact device, etc can be mounted on at least one carrier strip 10 by the fastening device 300. The relevant fastening device 300 here protrudes freely forwards and/or backwards in a relevant longitudinal direction. The connecting section can moreover be, for example, for an electrical cable which is to be connected, a printed circuit board which is to be connected, etc, i.e. take the form of, for example, a crimping section, a welding section, a soldering section, a press-fit section, etc.

For this purpose, the relevant contact device 30, 32 has, in the longitudinal direction Lr30, Lr32, a single carrier strip 10 on its rear edge (FIG. 3) or precisely two carrier strips 10 on its front and rear edge (FIG. 4) per (individual) fastening section 300.

In the embodiment of FIG. 3, each individual technical component 30 can be fastened to/on the carrier strip 10 by one of its long ends and/or by one of the sections of its long ends. A different end or a different section, such as a central section or an end section, of the technical component 30 can of course also be used. This means that each end of each section of the technical component 30 can be referred to as a long end or a section of a long end; a long end or a section of a long end aligns with one of the longest or the longest dimension of the technical component 30.

In the embodiment of FIG. 4, this can be expanded to two or more carrier strips 10 per component pack 1. Each individual technical component 30 can be configured in a similar fashion between two carrier strips 10. At least one further carrier strip 10 can also be used in a similar fashion, for example in each case in a central region of the technical component 30. The carrier strips 10 can hereby be configured in the same or different (rolled up) planes.

In embodiments, in a plan view of the longitudinal direction Lr10 of the carrier strip 10, the technical components 30 do not cover or align with most or a substantial part of the carrier strip 10. The technical components 30 can moreover take the form of technical mass-produced large parts within the scope of meaning of technical mass-produced small parts. This means that by virtue of the invention it is possible to extend the concept of mass-produced small parts (integral fastening) to mass-produced large parts (non-integral fastening).

The fastening section 300 is placed on a fastening section 100 of the carrier strip 10, wherein the relevant fastening sections 100, 300 are fixed against each other, which in the present case is effected by in each case at least one rivet. In the present case, two rivets are used for each pair of relevant fastening sections 100, 300.

A relevant thickness of a material layer of the actual technical component 30, of the actual technical component 30 essentially immediately before its fastening section 300 (i.e. within the technical component 30) and/or of the fastening section 300 of the technical component 30 can be more than or equal to 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.75 mm, 3 mm, 3.25 mm, 3.5 mm, 4 mm.

Figure 6:
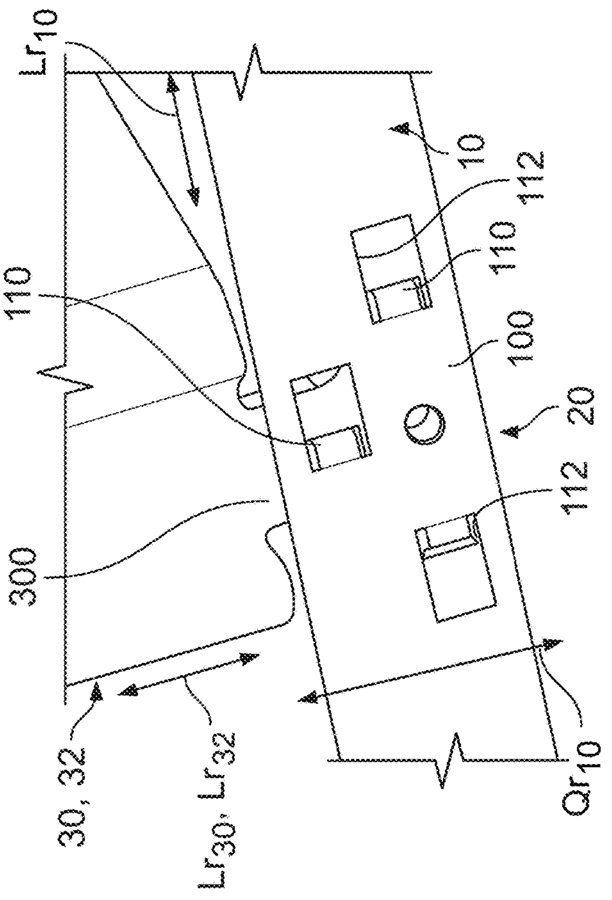
FIG. 6 is a detail bottom perspective view of the fastening of the electrical contact device to/on the carrier strip.
Figure 5:
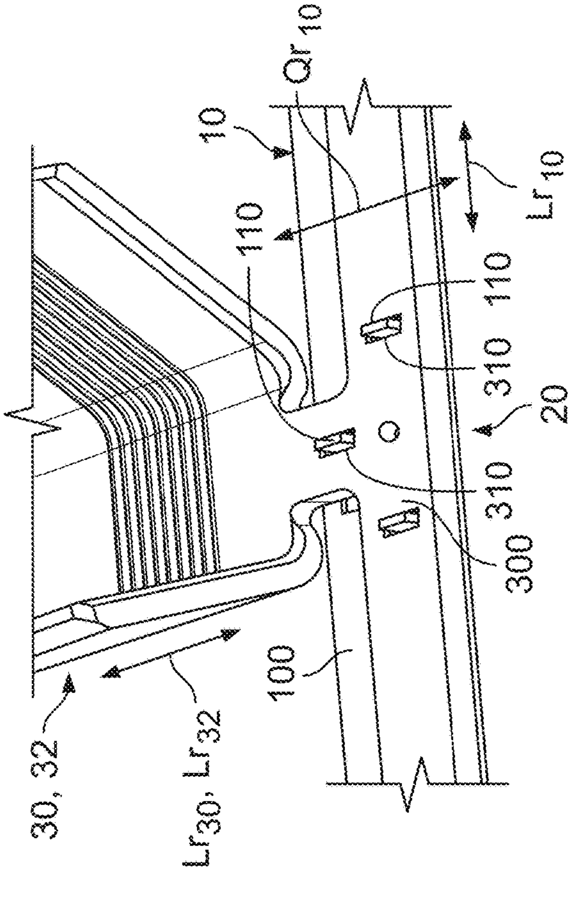
FIG. 5 is a detail top perspective view of a fastening of an electrical contact device to/on the carrier strip.

In the exemplary embodiments in FIGS. 5 and 6, an essentially frictional fastening 20 of the contact devices 30, 32 to/on the carrier strip 10 is effected. With regard to the use of expendable materials, an individual fastening 20 is hereby effected solely by a contact device 30, 32 and the carrier strip 10. The fastening section 100 of the carrier strip 10 hereby has at least one fastening tab 110 per fastening 20, wherein in the present case three fastening tabs 110 are used per fastening 20. The fastening tabs 110 are here integrally bent out from a plane of the carrier strip 10 and from a layer of material of the carrier strip 10, wherein recesses 112 for bending the fastening tabs 110 out from the fastening section 100 are required or are formed. In each fastening 20, a respective fastening section 300 of the contact device 30 has at least one fastening recess 310, corresponding thereto, wherein in the present case three fastening recesses 310 are of course used per fastening 20. In each fastening 20, a fastening tab 110 is then pushed through its respective fastening recess 300. Just one, two, three, four, five or more such fastening tabs 110 and fastening recesses 300 can hereby be used per fastening 20.

Following this, the fastening tabs 110 projecting from the fastening recesses 310 are peened over, as a result of which the contact devices 30, 32 are fixed to/on the carrier strip 10. A snap-fit can also be used here, for which purpose, for example, the free end sections of the fastening tabs 110 are designed accordingly. According to the invention, it is of course possible to configure the fastening tabs 110 on the technical components 30 and the fastening recesses 310 in the carrier strip 10.

The second alternative embodiment of the invention is explained in detail below with the aid of cell connector plate blanks 30, 34 which are to be processed by way of example (pure form on far right in FIG. 7) and are further processed to form a cell connector plate 30, 34 (pure form on far left in FIG. 7) for an accumulator or a battery. The cell connector plate blank 30, 34 hereby gradually (from right to left in FIG. 7) increasingly assumes the form of the cell connector plate 30, 34. The following embodiments of the cell connector plate blanks 30, 34 can of course also be applied to other blanks 30, 34 to be processed or other technical components 30 to be processed, for example punched parts, etc.

One aspect of an electric vehicle or a hybrid vehicle is the handling of high electrical operating currents and/or voltages, wherein a respective component such as, for example, a battery must be designed accordingly. The battery has electrically interconnected electrochemical storage cell modules which can be interconnected, for example, by electromechanical cell connector plates. Because an electric drive of an electric or hybrid vehicle can call off a high electrical current quickly, the cell connector plates inserted between the storage cell modules of a battery must have a corresponding electrical conductivity and be capable of compensating varying gaps between the storage cell modules owing to manufacturing tolerances.

According to the second alternative embodiment of the invention (see FIG. 7), a plurality of separately formed cell connector plate blanks 30, 34 are fastened by fastening 20 to at least one carrier strip 10 which extends in a longitudinal direction Lr10. The cell connector plate blanks 30, 34 here protrude from the carrier strip 10 in a transverse direction Qr10 of the carrier strip 10. In the present case, the transverse direction Qr10 is essentially parallel to the longitudinal directions Lr34 of the cell connector plate blanks 30, 34. Other positions, i.e. a slanting arrangement, may be used here. When an original cell connector plate blank 30, 34 (on the far right in FIG. 7) is being mechanically rigidly connected to the carrier strip 10, immediately after this or later, the resulting component pack 1 can be further rolled up spirally to form a bundle 0 or further processed (see the nine steps below).

Figure 7:
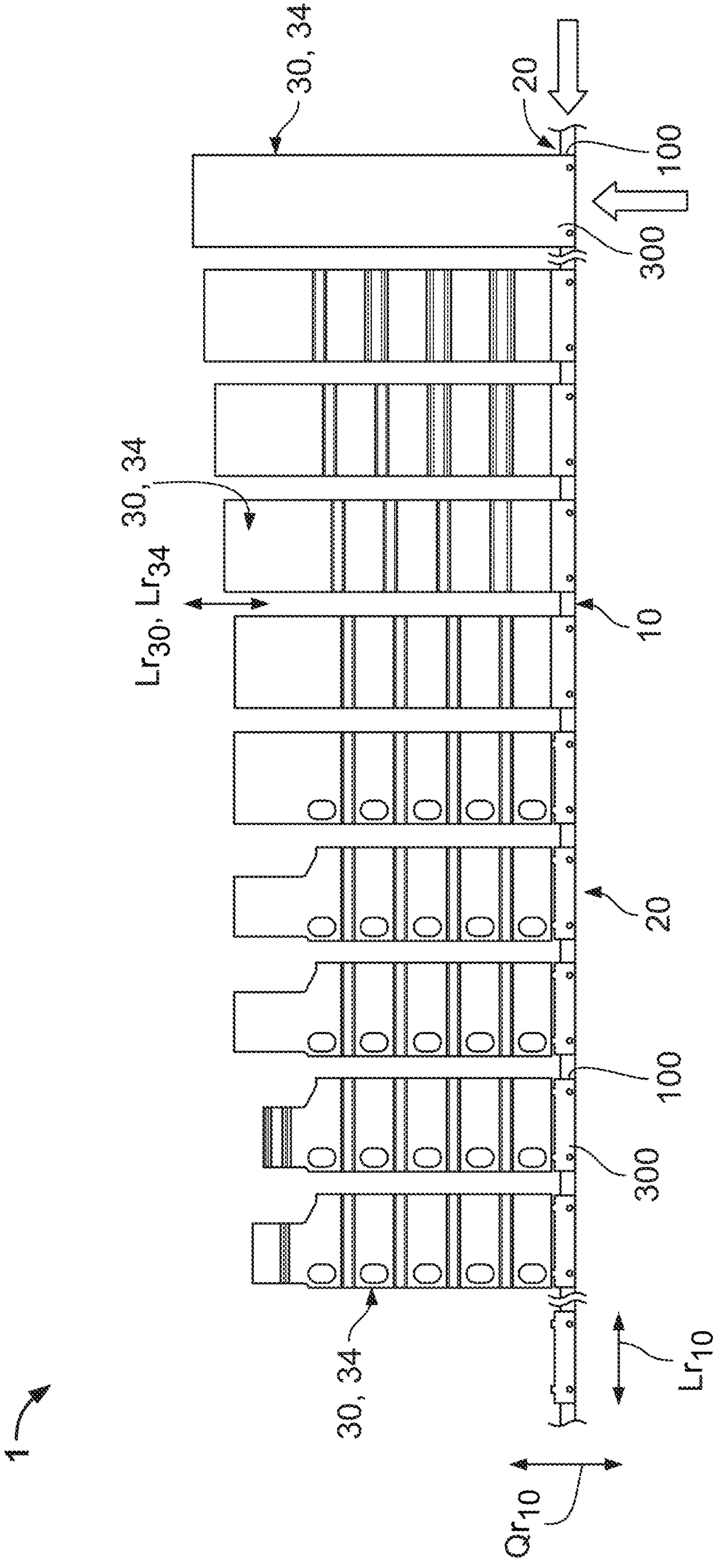
FIG. 7 is a plan view of a component pack according to another embodiment with a plurality of cell connector plate blanks in various stages of processing to form cell connector plates.

During the formation of the component pack 1, a strip from which the cell connector plate blanks 30, 34 are detached can, by the intermittent advance of a component set (FIG. 7: arrow on the right, below the carrier strip 10), be positioned, fastened, for example TOX-clinched, and cut to size above the carrier strip 10 which is advanced from the right-hand side likewise in an intermittent fashion (FIG. 7: arrow on the right, to the side of the carrier strip 10).

Following this, the component pack 1 can be rolled up spirally to form a bundle, possibly packaged and transported for further processing (the break in the carrier strip 10 shown graphically on the right in FIG. 7). It is of course possible to introduce the further processing essentially immediately after fastening the cell connector plate blanks 30, 34, wherein the component pack 1 may not be rolled up at all to form the bundle 0.

Subsequently, for example after being transported, the bundle 0 is unrolled and the cell connector plate blanks 30, 34 can be formed to make usable cell connector plates 30, 34 (on the far left in FIG. 7) in a further processing process with, in the present case, nine steps. This is shown on the carrier strip 10 as the component pack 1 shown partially is advanced gradually to the left in FIG. 7.

The, in the present case, nine steps of the further processing process per cell connector plate blank 30, 34 are: four steps to corrugate the cell connector plate blanks 30, 34 (resilient suitability for thermal equalization); a fifth step in which a link (which may have predetermined breaking points) to the carrier strip 10 is perforated and cut; a sixth cutting step; a seventh deburring step; and an eighth and ninth step of forming an L-shaped bend. The cell connector plate blank 30, 34 is hereby gradually increasingly processed to form the cell connector plate 30, 34 which is formed essentially completely in the last step.

Essentially immediately after this, the component pack 1 can be rolled up again for further processing. Moreover, essentially immediately following this, the usable cell connector plates 30, 34 are detached and the carrier strip 10 with the fastening sections 300 of the cell connector plate blanks 30, 34 or the cell connector plates 30, 34 is shredded (break in the carrier strip 10 shown graphically on the left in FIG. 7).

The above described exemplary embodiments can be used with a plurality of other technical components 30 which in particular do not take the form of technical mass-produced small parts but instead in particular take the form of technical mass-produced large parts, such as assemblies or complex individual parts. The invention can in particular be used when such technical components 30 need to be packed (collected and sorted), packaged, transported, further processed, processed, used for a final purpose, etc.

According to the invention, the component pack 1 or the bundle 0 does not comprise an integral carrier strip 10 or one which is made from a single piece of material, or an integral reel or one which is made from a single piece of material, with, for example, technical devices, technical apparatuses, in particular electrical and/or mechanical contact apparatuses, etc. The technical components 30 are not suited mainly, essentially or exclusively for artistic, craft, handicraft, decorative, identification (labels, stickers, etc), user-oriented, consumption-oriented, food-oriented (multipack, etc.), pleasure-oriented (string of chewing gum, etc.), etc. purposes and are therefore not designed for essentially non-technical purposes. This applies in particular, for example, for collective or individual but of course also for industrial use (for example, in the case of labels).

In the mounting method according to the invention, a component pack 1 is formed which is formed according to the invention, wherein the technical components 30 of the component pack 1 are fastened on the carrier strip 10 of the component pack 1 for and/or before, during or after a step of further processing, manufacturing, packaging, transport, additional further processing and/or component-determined final use of the component pack 1, etc.

Following a production chain of the technical components 30 in space and time, the mounting method can be integrated into the production chain of the technical components 30. The technical components 30 can moreover be packed by machine, as a result of which small-scale packaging, simple transport, further processing by machine and/or final processing by machine is or are enabled.

This means, for example, that the mounting method according to the invention—apart from a packing step—becomes a final part of the production chain of the technical components 30 (packing the technical components together). The method can moreover connect the production chain of the technical components 30 to a further-processing production chain which requires the technical components as a prerequisite. Many further uses in which the technical components 30 can be packed by machine according to the invention in order to be able to further process them by machine, transport them, make final use of them, etc are of course possible.

According to the invention, the automated equipping of the carrier strip 10 with the technical components 30 to form a component pack 1 is possible, as a result of which it is possible to eliminate manual handling of the technical components 30 after the technical components 30 have been formed. According to the invention, the component pack 1 can moreover be further processed by machine. Consequently, many steps in a manufacturing chain which may be located elsewhere can be simplified, which can afford a significant cost benefit. According to the invention, relatively large quantities of large parts can furthermore be (further) processed in an automated fashion. Products consisting of a continuously or discontinuously produced component pack improve handling speed. More efficient and cost-effective manufacturing at a higher degree of technical accuracy than in the prior art is therefore possible according to the invention.

What is claimed is:

1. A component pack, comprising:

a carrier strip extending in a longitudinal direction; and a plurality of technical components formed initially separately from the carrier strip, each of the plurality of technical components is an electrical contact device that is a single piece of conductive material and has an integrally formed fastening device extending beyond a front free edge or a rear free edge of the electrical contact device, the fastening device fastens each of the technical components on the carrier strip, the technical components project from the carrier strip laterally in a transverse direction of the carrier strip.

2. The component pack of claim 1, wherein the technical components are each fastened on the carrier strip in all translational directions and all rotational directions.

3. The component pack of claim 1, wherein the technical components are each assemblies, prefabricated parts, or blanks.

4. The component pack of claim 1, wherein the component pack is rolled up spirally into a bundle.

5. The component pack of claim 1, wherein:

the technical components are fastened on the carrier strip in an interlocking, frictional and/or bonded fashion; and/or the technical components are fastened on the carrier strip by being welded, soldered, adhesively bonded, joined, riveted, peened over, press-fitted, crimped, clipped, snap-fitted and/or screwed.

6. The component pack of claim 1, wherein the carrier strip is formed from a metal, a plastic, a composite material, a textile, or a cardboard.

7. The component pack of claim 1, wherein, in a plan view of the longitudinal direction of the carrier strip, the technical components do not cover or align with most or a substantial part of the carrier strip.

8. The component pack of claim 1, wherein the technical components are not suited mainly, essentially or exclusively for artistic, craft, handicraft, decorative, identification, user-oriented, consumption-oriented, food-oriented, or pleasure-oriented purposes and are therefore not designed for essentially non-technical purposes.

* * * * *